United States Patent
Shao et al.

(10) Patent No.: US 8,495,218 B1
(45) Date of Patent: Jul. 23, 2013

(54) MANAGING SYSTEM RESOURCES

(75) Inventors: Wei Shao, Kirkland, WA (US); Zhen Lin, Bellevue, WA (US)

(73) Assignee: Google Inc., Mountain View, CA (US)

( * ) Notice: Subject to any disclaimer, the term of this patent is extended or adjusted under 35 U.S.C. 154(b) by 274 days.

(21) Appl. No.: 13/010,926

(22) Filed: Jan. 21, 2011

(51) Int. Cl.
*G06F 15/173* (2006.01)
*G06F 9/46* (2006.01)

(52) U.S. Cl.
USPC ............ 709/226; 709/223; 709/224; 718/104

(58) Field of Classification Search
USPC .................................. 709/223–226; 718/104
See application file for complete search history.

(56) References Cited

U.S. PATENT DOCUMENTS

| | | | | |
|---|---|---|---|---|
| 6,125,394 | A * | 9/2000 | Rabinovich ................... | 709/226 |
| 7,296,071 | B2 * | 11/2007 | Paila et al. .................... | 709/226 |
| 7,624,246 | B2 * | 11/2009 | Konecny et al. .............. | 711/170 |
| 7,650,331 | B1 | 1/2010 | Dean et al. | |
| 7,844,972 | B2 * | 11/2010 | Raja et al. ..................... | 718/104 |
| 2001/0037394 | A1 * | 11/2001 | Yoshimura et al. ........... | 709/228 |
| 2002/0194251 | A1 * | 12/2002 | Richter et al. ................ | 709/105 |
| 2006/0155564 | A1 * | 7/2006 | Fisher et al. ...................... | 705/1 |
| 2006/0155764 | A1 * | 7/2006 | Tao ............................ | 707/104.1 |
| 2006/0236368 | A1 * | 10/2006 | Raja et al. ......................... | 726/1 |
| 2007/0180215 | A1 * | 8/2007 | Cascaval et al. .............. | 711/202 |
| 2008/0016214 | A1 * | 1/2008 | Galluzzo et al. ............. | 709/226 |
| 2008/0071910 | A1 * | 3/2008 | Thukral ........................ | 709/226 |
| 2008/0195614 | A1 * | 8/2008 | Lutz et al. .......................... | 707/7 |
| 2009/0094176 | A1 * | 4/2009 | Williams et al. ................ | 706/12 |
| 2009/0109959 | A1 * | 4/2009 | Elliott et al. .................. | 370/352 |
| 2009/0228537 | A1 * | 9/2009 | Branda et al. ................. | 707/206 |
| 2009/0265450 | A1 * | 10/2009 | Helmer et al. ................ | 709/221 |
| 2010/0058348 | A1 * | 3/2010 | Schneider ..................... | 718/104 |
| 2010/0242048 | A1 * | 9/2010 | Farney et al. ................. | 718/104 |
| 2011/0047617 | A1 * | 2/2011 | Averbuch et al. .............. | 726/22 |
| 2011/0138037 | A1 * | 6/2011 | Sharma et al. ................ | 709/224 |
| 2011/0191477 | A1 * | 8/2011 | Zhang et al. .................. | 709/226 |
| 2011/0276629 | A1 * | 11/2011 | Canning et al. .............. | 709/204 |
| 2011/0295988 | A1 * | 12/2011 | Le Jouan ...................... | 709/223 |
| 2012/0089734 | A1 * | 4/2012 | Mercuri ........................ | 709/226 |
| 2012/0144038 | A1 * | 6/2012 | Hildebrand ................... | 709/226 |
| 2012/0158951 | A1 * | 6/2012 | Seifert ........................... | 709/224 |
| 2012/0167113 | A1 * | 6/2012 | Levin et al. ................... | 718/104 |
| 2012/0203822 | A1 * | 8/2012 | Floyd et al. ................... | 709/203 |
| 2012/0272243 | A1 * | 10/2012 | Nolterieke et al. ............... | 718/1 |

* cited by examiner

*Primary Examiner* — Alina N Boutah
(74) *Attorney, Agent, or Firm* — Fish & Richardson P.C.

(57) ABSTRACT

Methods, systems, and apparatus, including computer programs encoded on a computer storage medium, for managing system resources. In one aspect, a system monitors the number of items, and deallocates system resources for the least-important items when the number of items exceeds a predefined capacity. The importance of each item is determined, for example, based on the item's subscription count such that system resources are utilized for the benefit of the greatest number of users or to improve the quality of service.

21 Claims, 4 Drawing Sheets

MANAGING SYSTEM RESOURCES

BACKGROUND

This specification relates to digital data processing and, in particular, to managing system resources.

Inefficient allocation of limited computer system resources, e.g., processing cycles, network bandwidth, and data storage, can often lead to decreased system performance, system failure, and/or costly expenditures to increase or expand system capacity. These expenditures may include hardware costs, the costs of acquiring additional space to house new equipment, increased utility costs for cooling and powering the new equipment, man power costs for maintaining the equipment, and other overhead costs.

SUMMARY

A system monitors the number of items, and deallocates system resources for the least-important items when the number of items exceeds a predefined capacity. The importance of each item is determined, for example, based on the item's subscription count such that system resources are utilized for the benefit of the greatest number of users or to improve the quality of service.

In general, one innovative aspect of the subject matter described in this specification can be embodied in methods that include the actions of managing a system resource having a fixed capacity to service a plurality of web resources utilized by multiple users, each web resource having a respective allocation of the system resource, such that managing includes determining a plurality of scores, each associated with a corresponding one of the plurality of web resources and each based, at least in part, on a subscription count associated with the corresponding web resource, the subscription count providing an indication of the web resource's importance to the multiple users; selecting a first group of one or more web resources based on their scores and not selecting a second group of one or more web resources based on their scores, wherein the first group of web resources have scores indicating the web resources are of lesser importance to the multiple users than the second group of web resources; and deallocating at least a portion of the system resource allocated to the first group of web resources. Other embodiments of this aspect include corresponding systems, apparatus, and computer programs, configured to perform the actions of the methods, encoded on computer storage devices.

These and other embodiments can each optionally include one or more of the following features. The actions can include monitoring system resource utilization over time to determine if a utilization threshold has been reached, and determining a score threshold based at least in part on the system resource utilization and the utilization threshold such that deallocating the portion of the system resource is sufficient to reduce the system resource utilization to the utilization threshold or beyond. The actions can include categorizing the web resources into multiple clusters based on their respective scores, determining a frequency of scores for each cluster, and determining a score threshold for use in selecting the first group of one or more web resources, the score threshold based on a utilization threshold and the frequency of scores such that a sum of the frequency of scores for clusters including the second group of one or more web resources is within the utilization threshold. Deallocating at least a portion of the system resource can include deallocating all the system resource allocated to the first group of web resources. The plurality of web resources can be web pages. The system resource can be a data storage resource. Selecting the first group of one or more web resources based on their scores can include selecting a first subgroup of web resources having scores beyond a first threshold, and selecting a second subgroup of web resources having scores beyond a second threshold; and deallocating at least a portion of the system resource allocated to the first group of web resources can include deallocating less than all the system resource allocated to the first subgroup of web resources, and deallocating all the system resource allocated to the second subgroup of web resources such that the second subgroup of web resources have scores indicating the web resources are of lesser importance to the multiple users than the first subgroup of web resources. Determining the plurality of scores can include calculating each score based, at least in part, on an amount of elapsed time since a user subscribed for a web feed of the corresponding web resource, the subscription count associated with the corresponding web resource, a viewing frequency of the web feed by subscribers, or a combination thereof.

Particular embodiments of the subject matter described in this specification can be implemented so as to realize one or more of the following advantages. Given a multi-user system with limited resources, the reallocation of system resources based on importance may benefit the majority of users and improve system performance. In some instances, operating costs may be reduced and costly expenditures deferred by redistributing the available resources based on interests or needs of a majority.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

In the description below, for the purposes of explanation, specific examples related to managing system resources for a web feed generation system storing multiple versions of web resources have been set forth in order to provide a thorough understanding of the implementations of the subject matter described in this specification. It is appreciated that the implementations described herein can be utilized in other capacities as well and need not be limited to web feeds or web resources. For example, implementations may be used to manage system resources utilized to service other types of resources, including, for example, word processing documents, portable document format (PDF) documents, images, and videos, and/or to provide other types of services, including, for example, mirroring services, caching services, archive services, multimedia streaming services, and indexing services. Further, implementations may be used to manage other types of system resources, including, for example, network bandwidth, processor cycles, and system or process module usage time. Accordingly, other implementations are within the scope of the claims.

Figure 1:
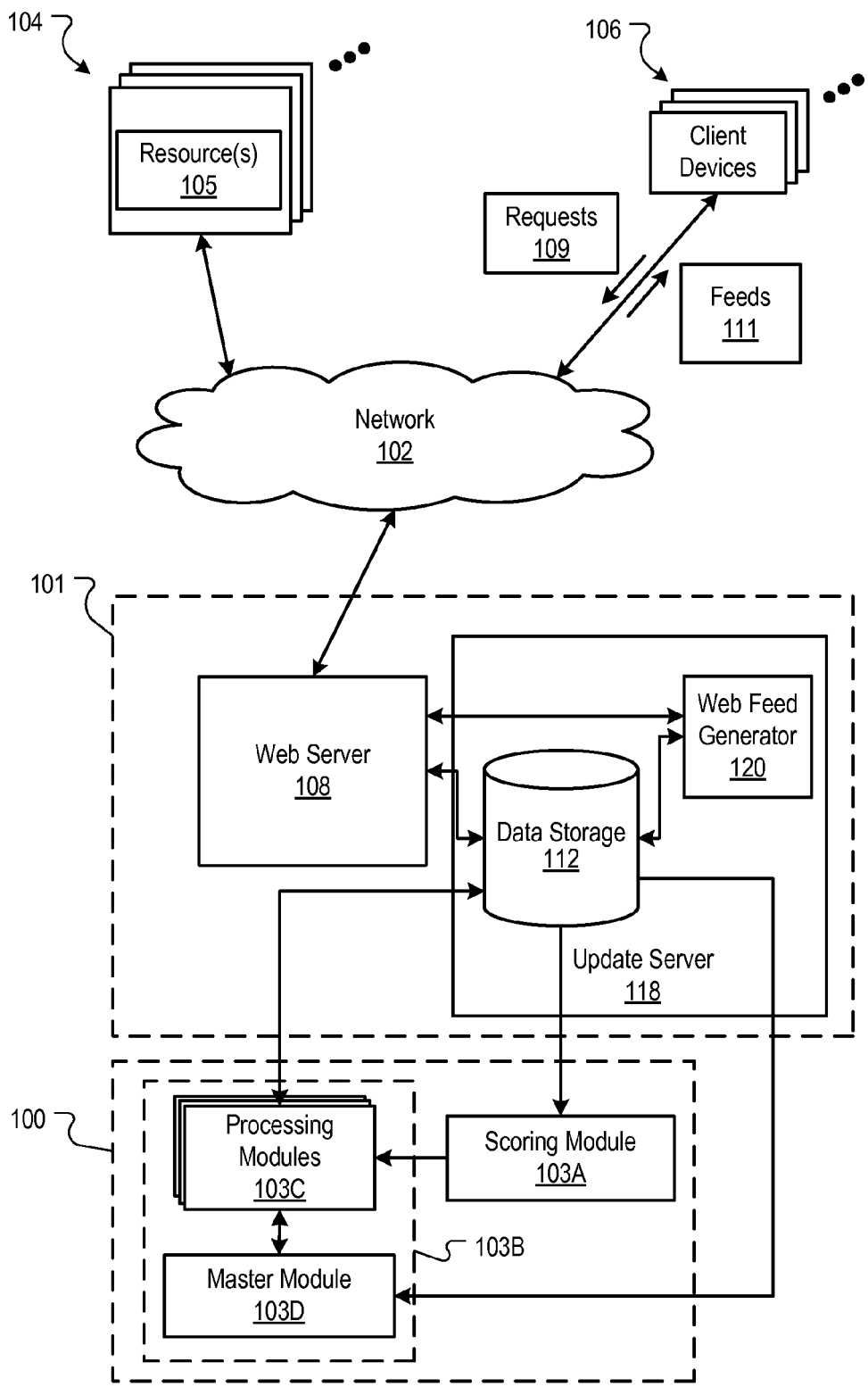
FIG. 1 is a block diagram of an exemplary resource management system servicing a web feed subscription system.

FIG. 1 is a block diagram illustrating an example resource management system 100 coupled to a web feed generation system 101 that generates web feeds 111 for client devices 106 in response to a request 109, e.g., a subscription. Web feed generation system includes a web server 108 coupled to a web feed generator 120 in an update server 118. A network 102, e.g., the Internet, connects websites 104, client devices 106, and the feed generation system 101.

Websites 104 include one or more web resources 105 associated with a domain name and hosted by one or more servers. An example website is a collection of web pages formatted in hypertext markup language (HTML) that can contain text, images, multimedia content, and programming elements, e.g., scripts. Each website 104, for example, is maintained by a publisher, e.g., an entity that manages and/or owns the website.

A web resource 105 is any data that can be provided by a website 104 or by a process such as an executing software program, for example, over the network 102 and that is associated with a web resource address such as a Uniform Resource Locator (URL), for instance. A web resource can be provided in one or more pieces, e.g., file fragments, or as a stream. Web resources 105 include HTML pages, eXtensible Markup Language (XML) documents, word processing documents, PDF documents, images, video, and feed sources, to name just a few. Web resources 105 can include content, e.g., words, phrases, and images and may include embedded information, e.g., meta information and hyperlinks or "links", and/or embedded instructions, e.g., JavaScript scripts.

A client device 106 is an electronic device capable of requesting and receiving web resources 105 over network 102. Example client devices 106 include personal computers, mobile communication devices, smart phones, server systems, and other devices that can send and receive data over network 102. Client device 106 typically includes a user application, e.g., a web browser, to facilitate the sending and receiving of data over network 102 and/or a web server application for re-publishing the data, e.g., for use by other client devices 106.

Web feed generation system 101 tracks web resources 105 and notifies subscribers of changes to the content. Update server 118 identifies web resources 105 by crawling, indexing, and caching web resources 105 provided by websites 104 or other processes. The cached copies of web resources 105 are stored in data storage 112, for example, to facilitate a comparison with later versions of the resource such that content differences can be detected and used by web feed generator 120 to generate a web feed summarizing the updated or new content. In some examples, data storage 112 stores information associated with each web resource, including, for example, an HTML Document Object Model (DOM), and aggregated information related to the web resource, including for example, the most popular query terms used to identify the web resource during a web search, click-through rates for links on the page, the number of subscribers interested in receiving content updates for the page, i.e., web feeds, or combinations of these or various other signals. A DOM tree contains all information of a single web page, including content, structure, and presentation information. A typical DOM tree consists of three different types of nodes: elements, attributes, and text. Among them, an element node has a name and may consist of an ordered list of sub-elements, a list of unordered attribute nodes, and text nodes. An attribute node is a leaf node with key/value pairs. A text node is also a leaf node that has only a text value.

Generally, each website 104 may include multiple web resources 105 which are systematically crawled to progressively update or expand content stored in data storage 112. The amount of information stored is limited, however, by the capacity of data storage 112.

In various implementations, data storage 112 also stores anonymized query related information submitted during user query sessions, e.g., search terms used to identify the page, and anonymized selection data specifying actions taken in response to providing and rendering the web resource. Selection data can include information indicating whether content, e.g., a link on a webpage, was selected, for example, by a mouse click, a finger gesture on a touch-sensitive surface, a speech command to a microphone, or by way of another input device, for example, in order to play the video or audio resources identified in the web resource, listen to speech synthesized text in the web resource, view text or multimedia content identified in the web resource. Selection data may also include, for example, information indicating actions taken by users after viewing the web resource, and whether the content was accessed until completely presented.

The query related information and selection data can be anonymized by various means. Various anonymization processes, such as hashing, encryption and obfuscation techniques, can be used to ensure that subject privacy is protected.

As subscription requests 109 to more web resources 105 are accepted, more data related to the web resource content and/or related information is processed and/or stored by web feed generation system 101. In many cases, however, new subscriptions 109 may pertain to a web resource 105 presently being serviced by web feed generation system 101. In those cases, a subscription count and/or other user information for web resource 105 is updated or recorded and no additional system resources are necessary for storing or generating a web feed for updates to web resource 105.

Referring again to FIG. 1, resource management system 100 is coupled to web feed generation system 101 to manage the processing and storage resources of web feed generation system 101 by monitoring system resource utilization, scoring items utilizing system resources based on the item's importance to a group of users of the system, and implementing a resource recovery policy based on each item's score. Resource management system 100 includes a scoring module 103A and a scanning module 103B.

Scoring module 103A computes a score for each web resource 105 based on one or more signals associated with each web resource's perceived importance to a group of users, i.e., an importance score, Sx. In various implementations, the particular signals used to calculate the importance scores depends on the type of resource and/or the service provided. For example, in web feed generation system 101, the selected signals may include signals indicating the resource's popularity with respect to users of the feed service—e.g., the last time a user subscribed for feeds of the URL, the number of subscribers to the URL, the frequency of which the feed of the web page is viewed by users; the resource's general popularity—e.g., query match frequency, number of page views; or may include other signals, e.g., how frequent the page changes, or a combination of these. In some implementations, the signals are collected, derived, or computed and stored in data storage 112. Once a sufficient amount of information is available to calculate a score, e.g., after one week of periodically or randomly crawling the URL, or monitoring page views, scoring module 103A normalizes and combines the individual signals to compute an importance score and associates it with the web resource. In some implementations, the normalized signal values are scaled with predefined weight values and combined linearly to calculate the final score. Weight values may be adjusted to increase or decrease the emphasis of each signal. Once importance scores are determined and associated with the corresponding web resource 105, e.g., by storing the score in a table indexed by the website's URL, they are made available to or provided to scanning module 103B. Scanning module 103B categorizes each web resource based on its score and determines whether the system resources allocated to the web resource should be deallocated, reduced, or maintained.

Scanning module 103B includes one or more processing modules 103C and a master module 103D. In some embodiments, scanning module 103B is implemented as a map-reduce process in which the processing modules are implemented as multiple map modules and the master module 103D is implemented as a reduce module, e.g., as described in U.S. Pat. No. 7,650,331, entitled SYSTEM AND METHOD FOR EFFICIENT LARGE-SCALE DATA PROCESSING, filed Jun. 18, 2004, the contents of which are incorporated herein in their entirety.

In general, each processing module 103C receives a list of web resources 105 and their respective scores from scanning module 103B, and comparison criteria determined by master module 103D. Processing modules 103C categorize each web resource into groups of items having similar scores by mapping each score into one of multiple bins and determining the frequency of each resource score, i.e., a histogram. In general, the number of bins N is selected to be big enough (millions) to provide sufficient resolution in picking score thresholds (described in more detail below). All the bins have the same width W, which is determined according to the score range, e.g., 0.0-1.0, and the value N. In some implementations, bin widths and the number of bins are determined based on the number of scores and/or the distribution of scores. For example, in some implementations, the number of bins is determined based on the square root of the total number of scores generated by scoring module 103A. Other techniques for determining the number of bins may also be used including, e.g., a direct assignment based on a predetermined bin width. The histogram data set generated by each processing module 103C is provided to master module 103D which compiles all the histogram data from each of the processing modules to generate a global histogram data set. Based on the global histogram data, master module 103D determines the criteria to be used to select the group of items to be truncated or deleted. An exemplary technique for determining the criteria is described below with respect to FIGS. 3 and 4. This criteria is then provided to each of the processing modules 103C for use in carrying out the system resource recovery policy.

The resource recovery policy is implementation dependent and is defined in view of considerations unique to the system being managed including, for example, the rate at which resources can be recovered under the recovery policy, the risk tolerance for the consequence of exhausting the system resources, and the speed at which system resources are allocated to new items.

For example, in some implementations, data storage resources are recovered by reducing/truncating the amount of information stored or processed at the expense of data service quality, e.g., in terms of the amount of information available or speed of processing, for that subset of items. In some cases, if the system resource usage nears capacity, more drastic measures are implemented. For example, in some instances, data storage resources are recovered by deleting or retiring a subset of items and/or halting the allocation of resources to those items. By selecting the subset of items based on an importance score associated with each item, a majority of users may benefit from the recovery policy without experiencing negative effects with regard to data quality or system performance. The criteria for implementing one or more of these recovery measures may be manually selected, e.g., by a system administrator, dynamically determined and adjusted based on the system's reaction speed and/or total system resource utilization, or determined based on a combination of these or other techniques.

An exemplary recovery policy for web feed generation system 101 includes two stages for managing storage resources in data storage 112. Stage one is initiated if the system resource utilization ($U_x$) exceeds a first utilization threshold ($U_a$), and stage two is initiated if $U_x$ exceeds a second utilization threshold ($U_b$), where $U_a < U_b$.

In some implementations, $U_x$ represents the total number of items utilizing the system resources, $U_a$ represents the maximum number of active items, and $U_b$ represents the maximum number of active and deactivated items. $U_a$ and $U_b$ are determined based on the capacity of the system (Cap), the amount of resources allocated per item (Alloc), and a utilization rates ($R_1$, $R_2$) such that $U_a = R_1 \times Cap/Alloc$ and $U_b = R_2 \times Cap/Alloc$. The utilization rates are selected to allow sufficient time for the management system to react by recovering allocated resources and/or to provide sufficient notice to an administrator that the resource utilization is nearing capacity. In some examples, the utilization rates for determining $U_a$ and $U_b$ are $R_1=80\%$ and $R_2=90\%$. Assuming a system capacity of 500 TB and a resource allocation of 100 kB for each item, $U_a=(80\% \times 500\text{ TB})/100\text{ kB}=4$ billion items. Similarly, $U_b=(90\% \times 500\text{ TB})/100\text{ kB}=4.5$ billion items. Therefore, the 500 TB system can maintain 4 billion active items and 500 million deactivated items. Other measures of system resources may be used based on the type of system resource being allocated, including, for example, bandwidth, processing cycles, and/or time.

In stage one, resource management system 100 deactivates items, i.e., truncates the stored content and terminates the generation of new web feeds for the item, having the lowest importance scores to recover a portion of the resources allocated to those items. For example, if each item utilizes 100 kB of data storage 112 and can be reduced to 20 kB by deleting a portion of the content stored, e.g., deleting previous versions of the item and keeping only historical and/or derived data related to the resource and/or the most recent web feed generated, an 80 kB allocation of data storage 112 can be recovered from each item. Users of the item are notified that the item has been selected for retirement and that future updates to content will not be provided by the web feed generation system. If after a period of time has elapsed, the item's score does not improve, e.g., by an increase in subscriptions for the item or an improvement in other signals on which the score is based, it is deleted to recover the remaining 20 kB of allocated resources.

The criteria for selecting or not selecting items for retirement depends on the target amount of system resources to be recovered and a global distribution of importance scores, i.e., an aggregate of the histograms received from each of the processing modules 103C. For example, in the 500 TB system above, assuming $U_x=4.2$ billion, at least 200 million items would need to be deactivated. Resource management system 100 determines a threshold score ($S_a$) required to reduce the number of active items by the target amount, e.g., $U_x - U_a$, based on the score distributions, frequency of scores, and/or the total number of items being serviced by the system resources. The system selects the minimum number of bins necessary to achieve the target recovery in order of increasing scores such that the total number of active items does not exceed Ua. Items in the selected bins are then deactivated while items in non-selected bins remain active. If after a period of time the scores for the selected items do not improve beyond the then current threshold score Sa', the items are deleted to recover the remaining portion of the allocated resources, and their scores are removed from the global histogram. If, however, an item's score improves beyond Sa', resource management system 100 allows the allocation of additional resources as necessary to reestablish or resume the web feed.

If system resource utilization continues to increase and exceeds the second utilization threshold, Ub, resource management system 100 initiates stage two. In stage two, resource management system 100 terminates any further allocation of resources to new items until Ux<Ub and determines a second threshold score (Sb) required to reduce the number of deactivated items by a target amount, e.g., Ux-Ub, based on the score distributions, frequency of scores, and/or the number of deactivated items. The system selects the minimum number of bins necessary to achieve the target recovery in order of increasing scores for bins such that the total number of deactivated items does not exceed Ub-Ua. Items in the selected bins are then deleted.

Figure 2:
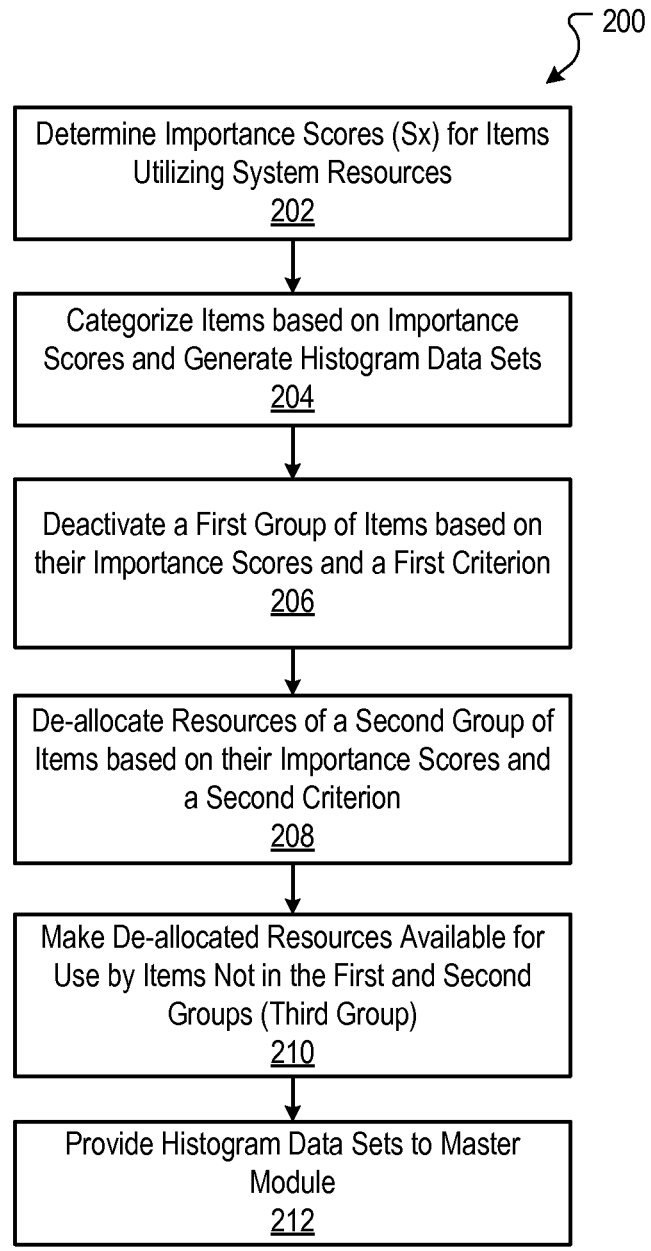
FIG. 2 is a flow chart of an exemplary technique for managing system resources.

Referring now to FIG. 2, process flow 200 illustrates an exemplary technique for managing system resources based on a multi-stage recovery policy. As shown, importance scores for a plurality of items, e.g., web resources 105, utilizing a portion of the system resources are determined (202) based on one or more signals indicating the value or importance of the item and/or the item's content, e.g., by scoring modules 103A, as described above. A list of items and the corresponding scores are then provided to a processing unit, e.g., processing modules 103C of scanning module 103B, where the scores for each item are combined to generate local histogram data sets (204). After the local histogram data sets are generated, they are provided to a master unit, e.g., master module 103D of scanning module 103B, (212) for use in determining one or more criteria and/or score threshold values to be used in managing and recovering system resources.

Based on a first criterion, e.g., Sx<Sa, the processing unit deactivates a first group of items, for example, by discontinuing access to the items or a service related to the items and de-allocating a portion of resources allocated to those items (206), and recovers additional system resources by de-allocating all resources allocated to a second group of items (208) based on a second criterion, e.g., Sx<Sb. De-allocated resources are then made available for use by a third group of items, e.g., those having an importance score Sx≧Sa or new items (210).

In some implementations, the scores are normalized and/or have a value between zero and one, inclusive. Further, in some examples, one or more of the signals are based on user interaction with the item, such as, for example, the number of times the item has been accessed or requested. In some instances, the first criterion requires the first group of items have a score less than a first score threshold value (Sa) and greater than or equal to a second threshold value (Sb), such that Sa is greater than Sb, and the second criterion requires the second group have a score less than the second threshold value (Sb). Resources allocated to the second group of items are de-allocated, for example, by truncating the data stored for each item further or by deleting the item altogether.

Figure 3:
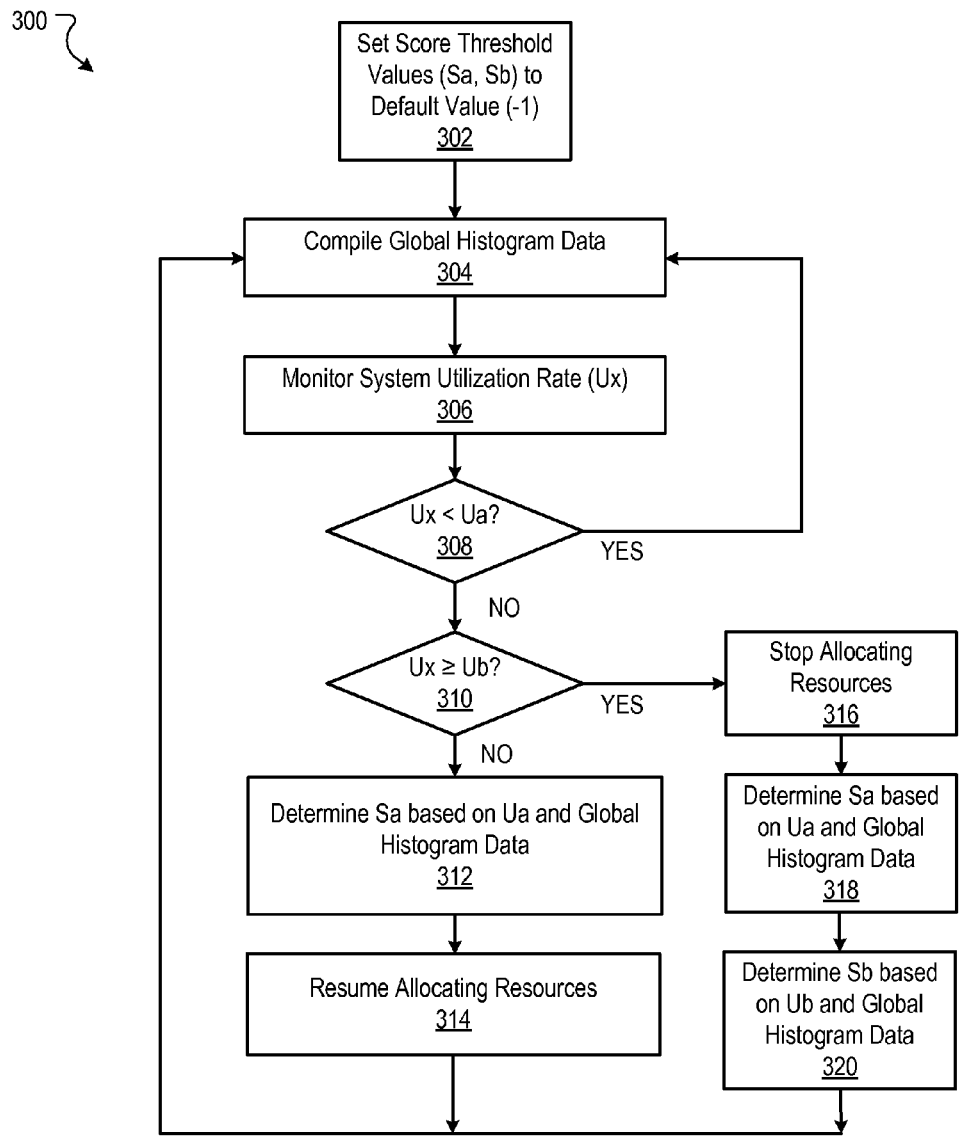
FIG. 3 is a flow chart of an exemplary technique for monitoring and controlling system resources.

Referring now to FIG. 3, process flow 300 illustrates an exemplary monitoring and control technique. The score threshold values are initially set to a value outside the score range such that none of the items fall into the first and second criterion (302). For example, if the item scores (Sx) are between zero and one, inclusive, the score threshold values (Sa, Sb) are set to negative one, such that Sx>Sa and Sx>Sb. A master unit, e.g., master module 103D of scanning module 103B, compiles a global histogram data set based on the data received from one or more processing units (304). The master unit also monitors the system resource utilization (Ux) (306) and determines if Ux is less than a first capacity threshold (Ua), e.g., the maximum number of items that the system can actively maintain while continuing to add new items, (308). If Ux is less than Ua, the master unit continues to compile additional histogram data and monitor Ux (304, 306).

If Ux is not less than Ua, the master unit determines whether Ux is greater than or equal to a second capacity threshold (Ub) (310). If not, the master unit dynamically determines and/or adjusts Sa according to a system resource recovery policy (312). For example, in some implementations, Sa is set to a value sufficient to reduce the total number of active items being serviced by the system to Ua by deactivating items having a score below Sa. If the continued allocation of resources was previously terminated, e.g., at (316), the master unit resumes allocating resources to items having scores greater than or equal to Sa (314).

If the master unit determines Ux is greater than or equal to Ub, the master unit terminates any further allocation of system resources to new items and dynamically determines and/or adjusts Sa and Sb according to the system resource recovery policy. For example, in some cases, Sa is set to a value sufficient to reduce the total number of active items to Ua and Sb is set to a value sufficient to reduce the total number of items being serviced by the system, i.e., active and deactivated, to Ub by deleting items having a score below Sb. Information associated with deleted items, including, for example, the item's DOM tree, and aggregated information related to the web resource, is permanently removed or overwritten as part of the deletion of the item. In some implementations, a system administrator is notified of a need to increase system resources Ux exceeds Ub, or before.

Once Sa and/or Sb are determined (312, 318, 320), they are made available, e.g., by storing the values in a predetermined location, or provided to the processing modules for use in determining whether the system resources allocated to each item should be deallocated, reduced, or maintained. The processing modules then recompile the local histograms with updated data from scoring modules, e.g., scoring module 103A, and provide the histograms to the master module.

In some embodiments, the calculation of scores, frequencies, and thresholds are such that one or more of the relationships and comparisons described above is reversed. For example, in some instances, importance scores are inversely proportional to each item's importance and items having scores above a threshold are selected for deactivation and/or deletion. Similarly, in some examples, the measure of resource utilization is inversely proportional to the number of items being serviced and determinations are made based on resource utilization falling below a utilization threshold.

In some examples, the techniques described above are implemented on two or more system resource management systems 100 managing the same set of system resources such that the sequences alternate between the management systems, for example, to ensure reliability. Further, in some examples, the map-reduce process implemented by scanner 103B executes periodically, e.g., once every two hours, to ensure the threshold values are still appropriate based on the resource utilization.

Figure 4:
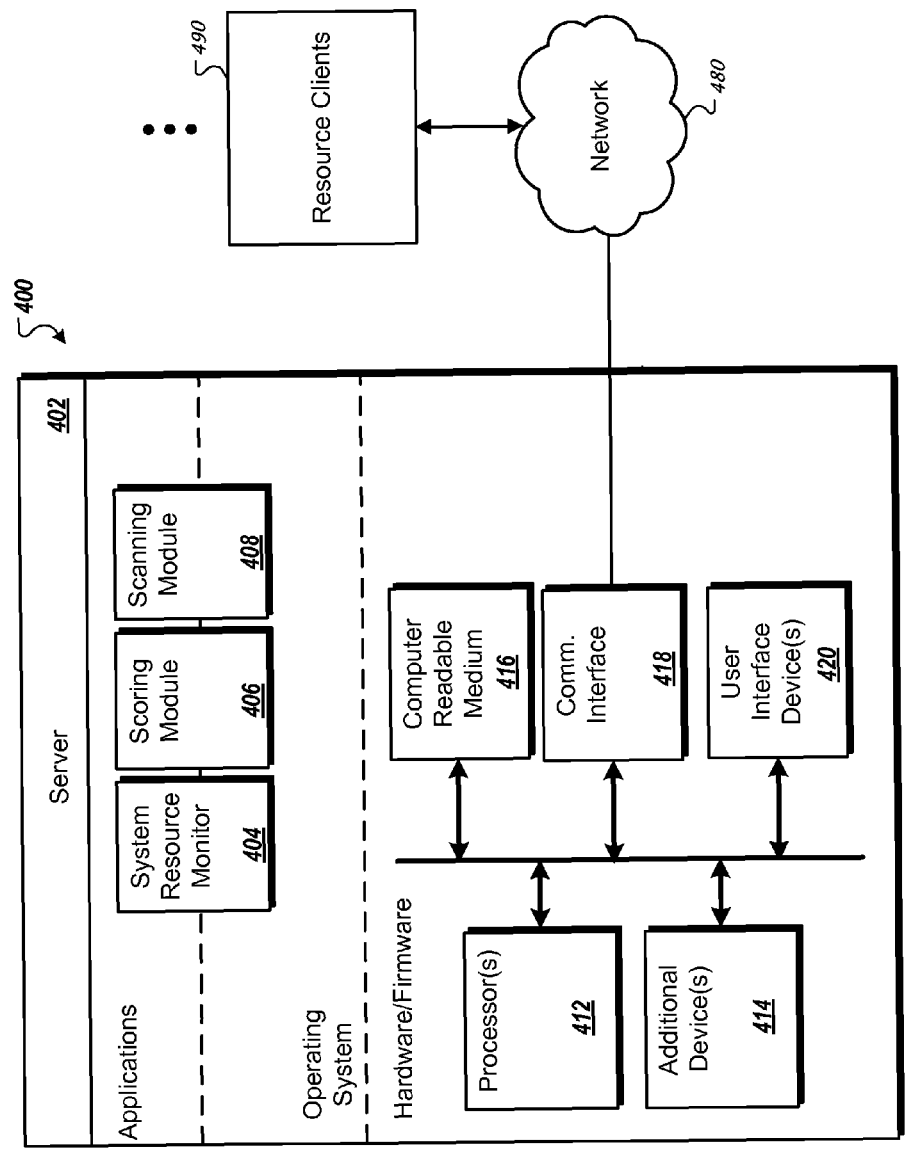
FIG. 4 is a block diagram of a resource management system.

FIG. 4 is a schematic diagram of an example resource management system. The system generally consists of a server 402. The server 402 is optionally connected to one or more resource clients 490 through a network 480. The server 402 consists of one or more data processing apparatus. While only one data processing apparatus is shown in FIG. 4, multiple data processing apparatus can be used. The server 402 includes various modules, e.g. executable software programs, including a system resource monitor 404 for monitoring resource utilization, a scoring module 406 for processing signals related to the items utilizing system resources and determining an importance score for such items, and a scanning module 408 for categorizing items based on the importance scores, and dynamically determining one or more criteria and/or threshold score values for managing system resources.

Each module runs as part of the operating system on the server 402, runs as an application on the server 402, or runs as part of the operating system and part of an application on the server 402, for instance. Although several software modules are illustrated, there may be fewer or more software modules. Moreover, the software modules can be distributed on one or more data processing apparatus connected by one or more networks or other suitable communication mediums.

The server 402 also includes hardware or firmware devices including one or more processors 412, one or more additional devices 414, a computer readable medium 416, a communication interface 418, and one or more user interface devices 420. Each processor 412 is capable of processing instructions for execution within the server 402. In some implementations, the processor 412 is a single or multi-threaded processor. Each processor 412 is capable of processing instructions stored on the computer readable medium 416 or on a storage device such as one of the additional devices 414. The server 402 uses its communication interface 418 to communicate with one or more computers 490, for example, over a network 480. Examples of user interface devices 420 include a display, a camera, a speaker, a microphone, a tactile feedback device, a keyboard, and a mouse. The server 402 can store instructions that implement operations associated with the modules described above, for example, on the computer readable medium 416 or one or more additional devices 414, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, e.g., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network, e.g., the Internet, and peer-to-peer networks, e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. A computer-implemented method comprising:
managing a system resource to service a plurality of web resources utilized by multiple users, each web resource having a respective allocation of the system resource, wherein managing comprises:
determining a plurality of scores, each associated with a corresponding one of the plurality of web resources and each based, at least in part, on a subscription count associated with the corresponding web resource, the subscription count providing an indication of the web resource's importance to the multiple users;
categorizing the web resources into multiple clusters based on the scores of the web resources;
determining a respective frequency of scores for each cluster;
determining a score threshold for use in selecting a first group of one or more of the web resources, the score threshold based on a utilization threshold and the respective frequencies of scores;
selecting the first group of one or more web resources, each web resource in the first group having an associated score that does not exceed the score threshold, and not selecting a second group of one or more web resources based on their scores, wherein the first group of web resources have scores indicating that the first group of web resources are of lesser importance to the multiple users than the second group of web resources;
deallocating at least a portion of the system resource allocated to the first group of web resources; and
wherein a sum of the frequency of scores for clusters including the second group of one or more web resources is within the utilization threshold.

2. The method of claim 1 further comprising:
monitoring system resource utilization over time to determine if a utilization threshold has been reached,
wherein deallocating the portion of the system resource is sufficient to reduce the system resource utilization to the utilization threshold or beyond.

3. The method of claim 1, wherein deallocating at least a portion of the system resource comprises deallocating all the system resource allocated to the first group of web resources.

4. The method of claim 1, wherein the plurality of web resources are web pages.

5. The method of claim 1, wherein the system resource is a data storage resource.

6. The method of claim 1, wherein selecting the first group of one or more web resources based on their scores comprises:
- selecting a first subgroup of web resources having scores beyond a first threshold; and
- selecting a second subgroup of web resources having scores beyond a second threshold; and
- wherein deallocating at least a portion of the system resource allocated to the first group of web resources comprises:
  - deallocating less than all the system resource allocated to the first subgroup of web resources,
  - deallocating all the system resource allocated to the second subgroup of web resources; and
- wherein the second subgroup of web resources have scores indicating that the second group of web resources are of lesser importance to the multiple users than the first subgroup of web resources.

7. The method of claim 1, wherein determining the plurality of scores comprises:
- calculating each score based, at least in part, on an amount of elapsed time since a user subscribed for a web feed of the corresponding web resource, the subscription count associated with the corresponding web resource, a viewing frequency of the web feed by subscribers, or a combination thereof.

8. A computer storage device encoded with a computer program, the program comprising instructions that when executed by data processing apparatus cause the data processing apparatus to perform operations comprising:
- managing a system resource to service a plurality of web resources utilized by multiple users, each web resource having a respective allocation of the system resource, wherein managing comprises:
  - determining a plurality of scores, each associated with a corresponding one of the plurality of web resources and each based, at least in part, on a subscription count associated with the corresponding web resource, the subscription count providing an indication of the web resource's importance to the multiple users;
  - categorizing the web resources into multiple clusters based on the scores of the web resources;
  - determining a respective frequency of scores for each cluster;
  - determining a score threshold for use in selecting a first group of one or more of the web resources, the score threshold based on a utilization threshold and the respective frequencies of scores;
  - selecting the first group of one or more web resources, each web resource in the first group having an associated score that does not exceed the score threshold, and not selecting a second group of one or more web resources based on their scores, wherein the first group of web resources have scores indicating that the first group of web resources are of lesser importance to the multiple users than the second group of web resources;
  - deallocating at least a portion of the system resources allocated to the first group of web resources and
  - wherein a sum of the frequency of scores for clusters including the second group of one or more web resources is within the utilization threshold.

9. The computer storage medium of claim 8, the operations further comprising:
- monitoring system resource utilization over time to determine if a utilization threshold has been reached, wherein deallocating the portion of the system resource is sufficient to reduce the system resource utilization to the utilization threshold or beyond.

10. The computer storage device of claim 8, wherein deallocating at least a portion of the system resource comprises deallocating all the system resource allocated to the first group of web resources.

11. The computer storage device of claim 8, wherein the plurality of items are web pages.

12. The computer storage device of claim 8, wherein the system resource is a data storage resource.

13. The computer storage device of claim 8, wherein selecting the first group of one or more web resources based on their scores comprises:
- selecting a first subgroup of web resources having scores beyond a first threshold; and
- selecting a second subgroup of web resources having scores beyond a second threshold; and
- wherein deallocating at least a portion of the system resource allocated to the first group of web resources comprises:
  - deallocating less than all the system resource allocated to the first subgroup of web resources,
  - deallocating all the system resource allocated to the second subgroup of web resources; and
- wherein the second subgroup of web resources have scores indicating that the second group of web resources are of lesser importance to the multiple users than the first subgroup of web resources.

14. The computer storage device of claim 8, wherein determining the plurality of scores comprises:
- calculating each score based, at least in part, on an amount of elapsed time since a user subscribed for a web feed of the corresponding web resource, the subscription count associated with the corresponding web resource, a viewing frequency of the web feed by subscribers, or a combination thereof.

15. A system comprising:
- a computer-readable storage device including instructions; and
- one or more data processing apparatus operable to execute the instructions and perform operations comprising:
  - managing a system resource to service a plurality of web resources utilized by multiple users, each web resource having a respective allocation of the system resource, wherein managing comprises:
    - determining a plurality of scores, each associated with a corresponding one of the plurality of web resources and each based, at least in part, on a subscription count associated with the corresponding web resource, the subscription count providing an indication of the web resource's importance to the multiple users;
    - categorizing the web resources into multiple clusters based on the scores of the web resources;
    - determining a respective frequency of scores for each cluster;
    - determining a score threshold for use in selecting a first group of one or more of the web resources, the score threshold based on a utilization threshold and the respective frequencies of scores;
    - selecting the first group of one or more web resources, each web resource in the first group having an associated score that does not exceed the score threshold, and not selecting a second group of one or more web resources based on their scores, wherein the first group of web resources have scores indicating that the first group of web resources are of lesser importance to the multiple users than the second group of web resources;

deallocating at least a portion of the system resources allocated to the first group of web resources and wherein a sum of the frequency of scores for clusters including the second group of one or more web resources is within the utilization threshold.

16. The system of claim 15, the operations further comprising:

monitoring system resource utilization over time to determine if a utilization threshold has been reached, wherein deallocating the portion of the system resource is sufficient to reduce the system resource utilization to the utilization threshold or beyond.

17. The system of claim 15, wherein deallocating at least a portion of the system resource comprises deallocating all the system resources allocated to the first group of web resources.

18. The system of claim 15, wherein the plurality of items are web pages.

19. The system of claim 15, wherein the system resource is a data storage resource.

20. The system of claim 15, wherein selecting the first group of one or more web resources based on their scores comprises:

selecting a first subgroup of web resources having scores beyond a first threshold; and selecting a second subgroup of web resources having scores beyond a second threshold; and wherein deallocating at least a portion of the system resource allocated to the first group of web resources comprises:

deallocating less than all the system resource allocated to the first subgroup of web resources;

deallocating all the system resource allocated to the second subgroup of web resources; and wherein the second subgroup of web resources have scores indicating that the second group of web resources are of lesser importance to the multiple users than the first subgroup of web resources.

21. The system of claim 15, wherein determining plurality of scores comprises:

calculating each score based, at least in part, on an amount of elapsed time since a user subscribed for a web feed of the corresponding web resource, the subscription count associated with the corresponding web resource, a viewing frequency of the web feed by subscribers, or a combination thereof.

* * * * *

UNITED STATES PATENT AND TRADEMARK OFFICE
CERTIFICATE OF CORRECTION

PATENT NO. : 8,495,218 B1  Page 1 of 1
APPLICATION NO. : 13/010926
DATED : July 23, 2013
INVENTOR(S) : Wei Shao et al.

It is certified that error appears in the above-identified patent and that said Letters Patent is hereby corrected as shown below:

In the Claims

Column 13, line 64, Claim 9: delete "medium" and insert -- device --, therefor.

Signed and Sealed this
Twenty-eighth Day of January, 2014

Michelle K. Lee
*Deputy Director of the United States Patent and Trademark Office*